United States Patent [19]

Tawaraya

[11] Patent Number: 4,979,079
[45] Date of Patent: Dec. 18, 1990

[54] SUN VISOR FOR AUTOMOTIVE VEHICLE
[75] Inventor: Makoto Tawaraya, Isehara, Japan
[73] Assignee: Nissan Motor Co., Ltd., Yokohama, Japan
[21] Appl. No.: 430,178
[22] Filed: Nov. 1, 1989
[30] Foreign Application Priority Data
   Nov. 9, 1988 [JP] Japan .................. 63-146517[U]
[51] Int. Cl.⁵ .............................................. F21V 33/00
[52] U.S. Cl. .................................... 362/135; 362/142; 362/144
[58] Field of Search ................................ 362/135–144
[56] References Cited

U.S. PATENT DOCUMENTS 4,652,982  3/1987  Flowerday ................... 362/136 X
4,683,522  7/1987  Viertel et al. .................. 362/135
4,710,856  12/1987  Cheung ...................... 362/135 X
4,794,497  12/1988  Jonsas et al. ................. 362/144 X

FOREIGN PATENT DOCUMENTS 61-117722  7/1986  Japan .

Primary Examiner—Allen M. Ostrager
Attorney, Agent, or Firm—Foley & Lardner, Schwartz, Jeffery, Schwaab, Mack, Blumenthal & Evans

[57] ABSTRACT

To maximize the areas of a vanity mirror and an illumination lid and to allow the illumination lid to be adjustably pivoted to obtain a desirable illumination angle, a vanity mirror is attached to a bottom surface of a square recess formed in the sun visor body, and an illumination lid provided with a lamp is slidably fitted to and moved away from the square recess to expose the vanity mirror.

4 Claims, 3 Drawing Sheets

SUN VISOR FOR AUTOMOTIVE VEHICLE

BACKGROUND OF THE INVENTION

1. Field of the Invention

The present invention relates generally to a sun visor for an automotive vehicle, and more specifically to a sun visor provided with vanity (toilet).

2. Description of the Prior Art

Various sun visors provided with a vanity mirror for automotive vehicles have been proposed. In particular, Japanese Published Unexamined (Kokai) Utility Model Application No. 61-117722 discloses a sun visor provided with a vanity mirror and a lamp unit, in which the mirror is attached to the back surface of a sun visor body and two lamps are mounted on both the side portions thereof, and further the mirror and the lamp unit are protected by a pivotal mirror cover.

In this prior-art sun visor provided with a vanity mirror, since the lamps are mounted on both the sides of the mirror and therefore the mirror is usable at night under illumination, this sun visor is convenient for the passenger. In this prior-art sun visor, however, since the mirror and the lamp unit are both arranged on a small limited area of the sun visor body, there exists a problem in that the areas of the mirror and the lamp unit are not sufficient. Further, when the illumination angle is required to adjust by pivoting the sun visor body, since the mirror angle simultaneously changes, it has been difficult to appropriately illuminate the passenger's face at a desirable illumination angle, so that the passenger's face cannot be clearly reflected in the mirror. In addition, when the pivotal mirror cover is pivoted open upward to expose the vanity mirror, since the free end of the mirror cover projects toward the face of the passenger, there exists a problem in that when kept open, the pivotal mirror cover is obstructive or dangerous to the passenger.

SUMMARY OF THE INVENTION

With these problems in mind, therefore, it is the primary object of the present invention to provide a sun visor for an automotive vehicle, by which both the mirror area and the illumination area can be increased and further the illumination angle can be adjusted independently from the mirror angle.

To achieve the above-mentioned object, a sun visor for an automotive vehicle, according to the present invention, comprises: (a) a sun visor body (10) formed with a recessed portion (10A); (b) a vanity mirror unit (20) attached to a bottom surface of the recess portion; and (c) an illumination lid unit (30) slidably fitted to the recessed portion formed in said sun visor body so as to be flush with a surface of said sun visor body and slidably moved away from the recessed portion along the surface of said sun visor body to expose said vanity mirror unit.

Further, a pair of guide rails (15) are arranged on both inner side surfaces of the recessed portion formed in the sun visor body; a guide shaft (32) is attached to the illumination lid unit so that both ends thereof are engageable with the guide rail, respectively; and two springs (34) are disposed between a side surface of the illumination lid unit and the guide rail. Therefore, the illumination lid can be slidably and pivotally moved relative to the sun visor body on the basis of an elastic force of the two springs.

Further, it is preferable that the illumination lid unit comprises a light source (35), a reflector (38) and a lens (39) (FIG. 3). Furthermore, the illumination lid unit comprises a pair of light source side terminals (33) and a pair of battery side terminals (40) to supply power to the light source whenever the illumination lid unit is slid to the extreme straight end of the guide rails to expose the vanity mirror.

DETAILED DESCRIPTION OF THE PREFERRED EMBODIMENT

Figure 1:
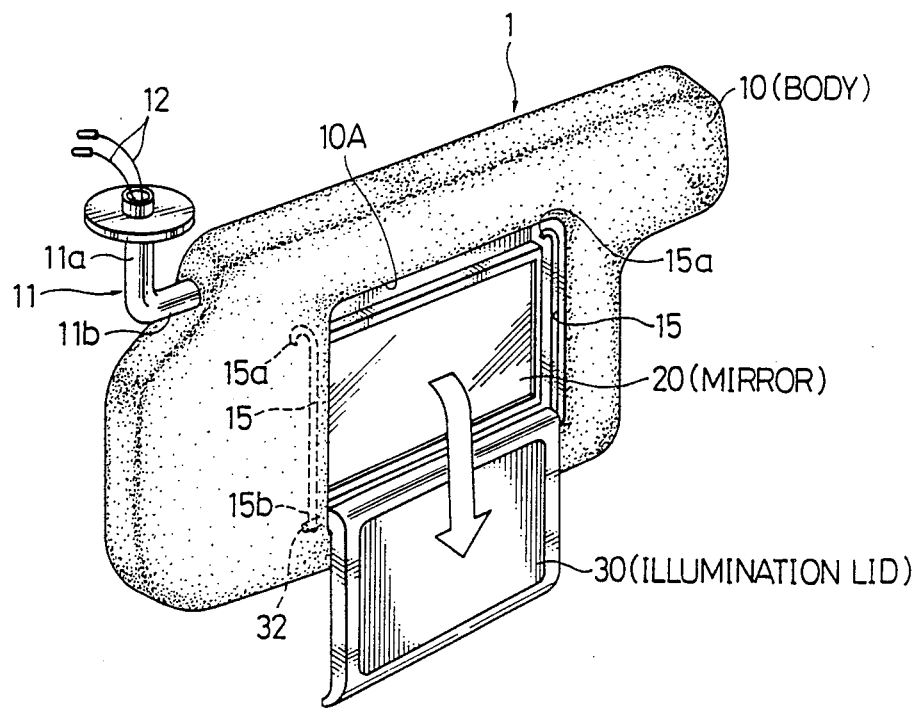
FIG. 1 is a perspective view showing an embodiment of the sun visor for an automotive vehicle according to the present invention.

An embodiment of the present invention will be described below with reference to the attached drawings. In FIG. 1, a sun visor 1 of the present invention roughly comprises a sun visor body 10, a vanity mirror unit 20, and an illumination lid unit 30.

The sun visor 1 is supported by an angled shaft 11 so as to be pivotable in two different directions. That is, when pivoted about a vertical axle 11a of the angled shaft 11, the sun visor 1 is moved from a front position with the sun visor surface placed parallel to a front windshield to a side position with the sun visor surface placed parallel to a side windshield or vice versa; when pivoted about a horizontal axle 11b of the angled shaft 11, the sun visor 1 is moved from an upper unusable position with the sun visor surface placed parallel to the vehicle roof to a lower usable position with the sun visor surface placed parallel to the front windshield or vise versa. Further, two wires 12 are passed through a hollow portion of the angled hollow shaft 11 to supply electric energy to the illumination lid unit 30.

The sun visor body 10 is formed with an illumination lid accommodating recessed portion 10A at roughly the middle of the rear surface of the sun visor body 10. Further, the vanity mirror unit 20 is attached to the bottom surface of this lid accommodating recessed portion 10A, and a pair of rails 15 each having a hook-shaped guide end 15a and a straight guide end 15b are formed on both the inner side surfaces of the lid accommodating recessed portion 10A in order to guide the illumination lid unit 30.

When a guide shaft (described later) 32 of the illumination lid unit 30 is guided to these hook-shaped guide ends 15a, the illumination lid unit 30 is completely fitted to lid accommodating recessed portion 10A so as to be flush with the surface of the sun visor body 10. When the guide shaft 32 is guided out of these hook-shaped guide ends 15a to the straight guide ends 15b thereof, the illumination lid unit 30 is slidably moved to the mirror illumination position, as shown in FIG. 1, where the vanity mirror unit 20 is completely exposed.

Figure 2:
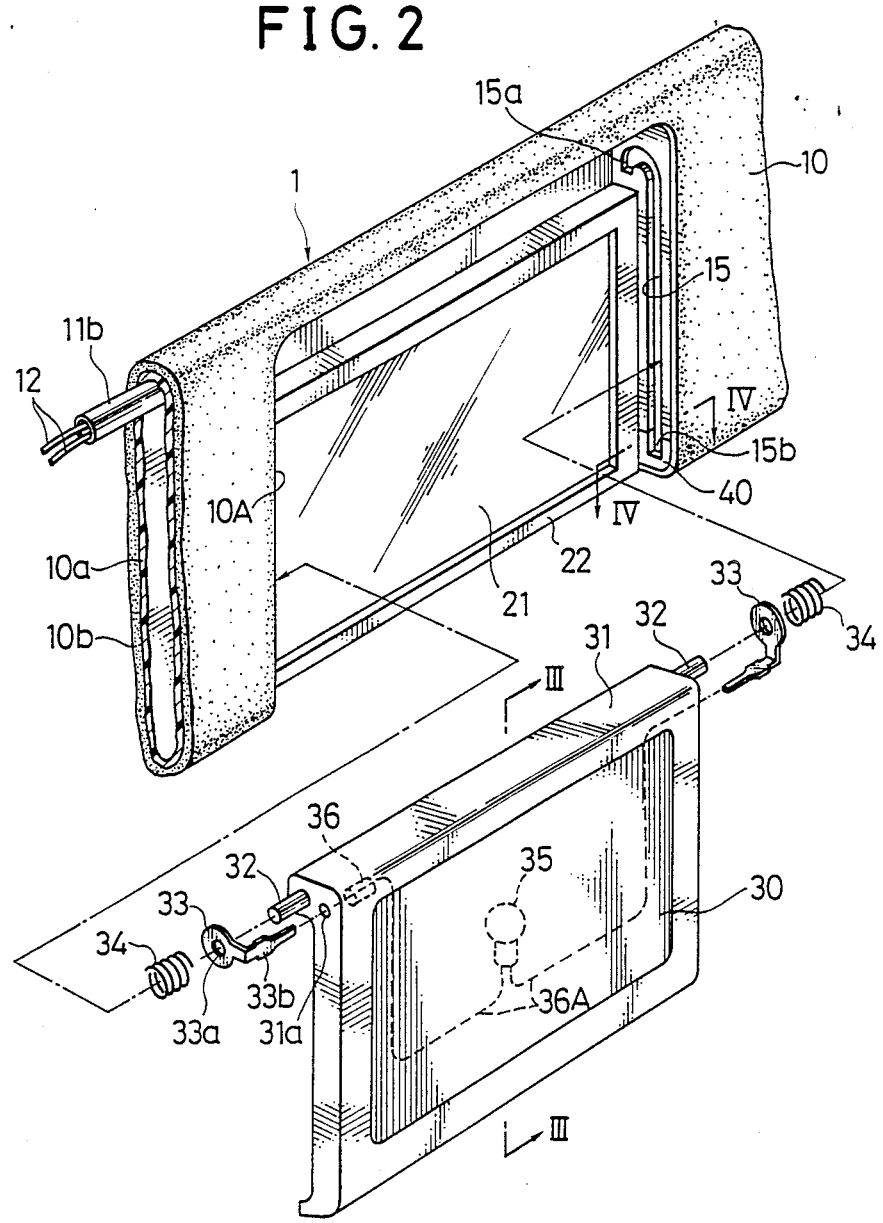
FIG. 2 is an exploded view for assistance in explaining the structure of the embodiment.

With reference to FIG. 2, in more details, the sun visor body 10 is formed of an inner resin plate 10a and an outer decorative foamed resin leather 10b, for instance. The vanity mirror unit 20 is composed of a mirror plate 21 and a mirror frame 22 for protecting and supporting the mirror plate 21. As already explained, the mirror frame 22 is fixed to the bottom surface of the lid accommodating recessed portion 10A by appropriate means (screws, bonds, etc.).

Figure 3:
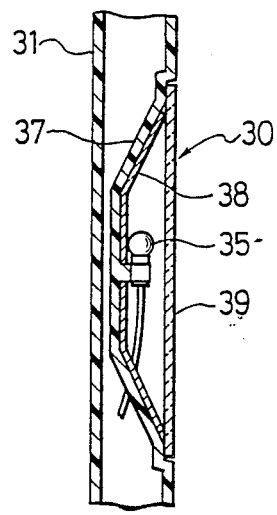
FIG. 3 is a partial cross-sectional view taken along the line III—III shown in FIG. 2.

The illumination lid unit 30 comprises a lid body 31, a guide shaft 32, a pair of lamp side terminals 33, a pair of helical springs 34, a lamp 35, a cylindrical wire terminal 36, and two wires 36A connected between the lamp 35 and the two wire terminals 36. The guide shaft 32 is slidably fitted into the rails 15 formed on both the inner side surfaces of the lid accommodating recessed portion 10A of the sun visor body 10. The lamp side terminal 33 is formed with a central hole 33a fitted to the guide shaft 32 and an angled straight portion 33b passed through a hole 31a formed on the side surface of the lid body 31 into contact with a cylindrical wire terminal 36. As shown in FIG. 3, the illumination lid 30 further comprises a lamp housing 37, a reflector 38 for reflecting light emitted by the lamp 35, and a square lens 39 for focusing light reflected from the reflector 38. Without being limited to the lamp (point light source) 35, it is also possible to use a fluorescent lamp or an electroluminescence plate (surface light source).

As shown in FIG. 2, the illumination lid unit 30 is set to the lid accommodating recessed portion 10A by engaging the guide shafts 32 with the guide rails 15.

In this case, the two lamp side terminals 33 and the two helical springs 34 each fitted to each guide shaft 32 are interposed between both the side surfaces of the lid body 31 and the inner surfaces of the guide rails 15 formed on both the inner side surfaces of the lid accommodating recessed portion 10A of the sun visor body 10. Therefore, the illumination lid unit 30 can be slid along the two guide rails 15 against a friction force generated between the helical springs 34 and the guide rails 15.

To automatically turn on the lamp 35 of the illumination lid unit 30 whenever the illumination lid unit 30 is slid away from the lid accommodating recessed portion 10A or the vanity mirror unit 29 is completely exposed, a switch mechanism SW is provided at both the straight guide ends 15b (in FIG. 2) of the guide rails 15.

Figure 4:
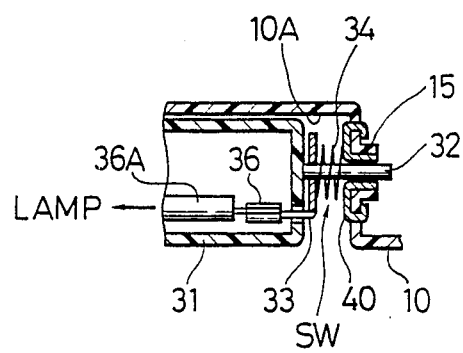
FIG. 4 is a partial; cross-sectional view taken along the line IV—IV shown in FIG. 2.

In more detail, with reference to FIG. 4, the switch mechanism SW is composed of the already explained helical spring 34, the lamp side terminal 33 (connected to the lamp 35 via the cylindrical wire terminal 36 and the wire 36A), and a battery side terminal 40 formed so as to correspond in shape to a straight guide end 15b of the guide rail 15. Therefore, a power voltage is supplied from a car battery (not shown), for instance, to the lamp 35 by way of a vehicle illumination circuit (not shown) for controlling the entire vehicle illumination, the battery side terminal 40, the helical spring 34, the lamp side terminal 33, the cylindrical wire terminal 36, the wire 36A, returning to the car battery by way of the same elements 36A, 36, 33, 34 and 40 as above but arranged on the opposite side.

Therefore, when the vehicle illumination circuit is activated at night, the lamp 35 comes on only when the illumination lid unit 30 is slid completely away from the lid accommodating recessed portion 10A and therefore the lamp side terminal 33 is brought into contact with the battery side terminal 40 via the helical spring 34. In other words, since the vehicle illumination circuit is kept deactivated in the daytime, the lamp 35 will not be lit up even if the illumination lid unit 30 is slid away from the lid accommodating recessed portion 10A. However, the illumination lid unit 30 is automatically activated (the lamp 35 comes on) only when completely slid away from the lid accommodating recessed portion 10A at night. Without being limited thereto, however, it also possible to mount an ordinary illumination switch (not shown) on the illumination lid unit 30, so that the lamp 35 can be manually turned on or off, irrespective of the conditions of the vehicle illumination circuit or the position of the illumination lid unit 30.

In use of the vanity mirror, the sun visor 1 is pivoted from the upper unusable position at which the sun visor is placed parallel to the vehicle roof to the lower usable position at which the sun visor is placed parallel to the front windshield. Under these conditions, the illumination lid unit 30 is directed toward the passenger as shown in FIG. 1. The illumination lid unit 30 is first moved upward and then downward so that the guide shaft 32 is slid along the guide rails 15 from the hook-shaped guide end 15a to the straight guide end 15b thereof. Under these conditions, since the vanity mirror 21 attached to the bottom surface of the lid accommodating recessed portion 10A is completely exposed, the passenger can use the exposed vanity mirror. In this case, since the illumination lid unit 30 is only slid downward along the surface of the sun visor body, the mirror exposure motion is safe for the passenger.

At night, since the vehicle illumination circuit is usually activated, the lamp 30 automatically comes on via the switch mechanism SW whenever the illumination lid unit 30 is slid to its extreme position (the guide shaft 32 is slid to the straight guide end 15b of the guide rail 15). Once the illumination lid unit 30 is activated, since the passenger face can be illuminated, it is possible to reflect the passenger face in the mirror. In this case, since the illumination lid unit 30 is supported by the sun visor body 10 on the basis of a friction force generated by the helical springs 34, it is possible to adjust the illumination angle of the illumination lid unit 30 relative to the sun visor body 10 so that the passenger face can be illuminated at a desirable illumination angle and therefore appropriately reflected in the mirror unit 20.

After use, the illumination lid unit 30 is slid upward toward the middle of the sun visor body 10; that is, the guide shaft 32 is slid along the guide rails 15 from the straight guide end 15b to the hook-shaped guide end 15a thereof. In this case, since the helical spring 34 is moved away from the battery side terminal 40, the illumination lid unit 30 is automatically deactivated. When the illumination lid unit 30 has been completely fitted into the lid accommodating recessed portion 10A of the sun visor body 10 so as to be flush with the surface of the sun visor body, the sun visor body 1 can be used for the original purpose.

As described above, in the sun visor for an automative vehicle according to the present invention, since the vanity mirror is attached to the bottom surface of the lid accommodating recessed portion formed in the sun visor body and further the illumination lid unit is slidably fitted to or moved from the lid accommodating recessed portion, it is possible to maximize the areas of the mirror and illumination. In this case, since the illumination lid unit is elastically slid along the guide rails formed in the sun visor body, the lid is not pivoted toward the passenger for safety. Further, after the lid has been slid to its extreme position to completely expose the mirror, since the lid angle can be adjusted about the guide shaft relative to the sun visor body, it is possible to adjust the illumination angle of the illumination lid unit so that the passenger face can be appropriately reflected in the mirror unit.

Further, a switch mechanism is provided in the sun visor body, it is possible to automatically turn on or off the illumination lid unit at night whenever the illumination lid unit is slid away from or into the lid accommodating recessed portion of the sun visor body.

What is claimed is:

1. A sun visor for an automotive vehicle comprising:
   (a) a sun visor body formed with a recessed portion;
   (b) a vanity mirror unit attached to a bottom surface of the recessed portion; and
   (c) an illumination lid unit provided with an illumination means and slidably fitted to the recessed portion formed in said sun visor body so as to be flush with a surface of said sun visor body, said illumination lid unit being slidably movable away from the recessed portion along the surface of said sun visor body to expose said vanity mirror unit and to activate said illumination lid unit for illumination.

2. The sun visor of claim 1, which further comprises:
   (a) a pair of guide rails arranged on both inner side surfaces of the recessed portion formed in said sun visor body, for slidably supporting said illumination lid unit, each of said guide rails being formed with a hook-shaped guide end and a straight guide end;
   (b) a guide shaft attached to said illumination lid unit and having both ends engageable with said guide rails, respectively; and
   (c) two springs each disposed between a side surface of said illumination lid unit and said guide rail, for providing elastically slidable and pivotal movement of said illumination unit relative to said sun visor body.

3. The sun visor of claim 2, wherein said illumination lid unit comprises:
   (a) a light source;
   (b) a reflector for reflecting light emitted by said light source from said illumination lid unit; and
   (c) a lens for focusing light reflected from said reflector.

4. The sun visor of claim 3, which further comprises:
   (a) a pair of light source side terminals attached to said guide shaft at both side surfaces of said illumination lid unit and connected to said light source, respectively; and
   (b) a pair of battery side terminals attached to the straight ends of a said guide rails, for supplying power to said light source by way of said battery side terminals, said springs, and said light source side terminals, whenever said illumination lid unit is slid to the straight end of said guide rails to expose said vanity mirror unit.

* * * * *